Figure 1:
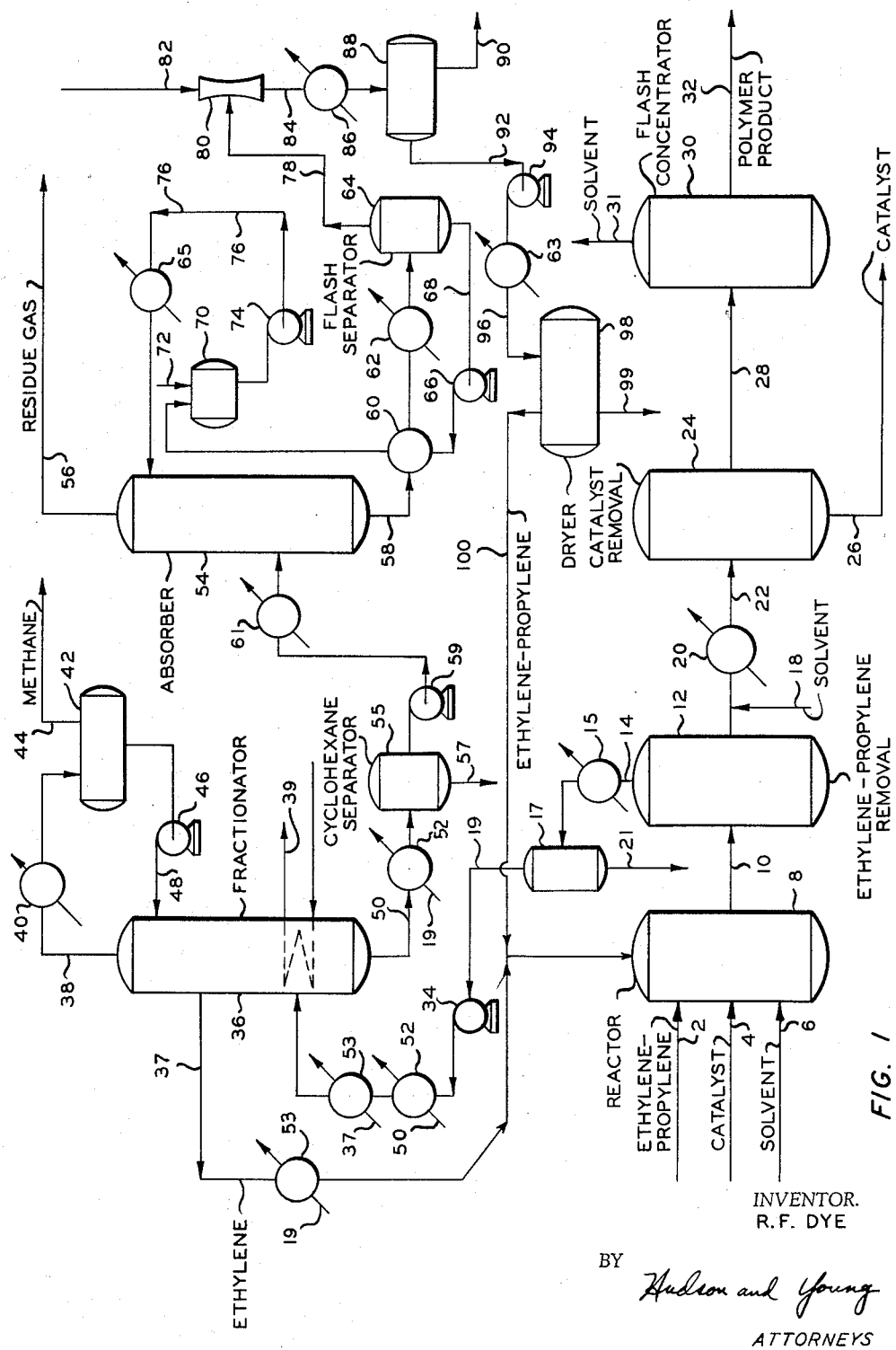

INVENTOR.
R.F. DYE

United States Patent Office 2,921,053
Patented Jan. 12, 1960

2,921,053

RECOVERY OF OLEFINS FROM HYDROCARBON MIXTURES

Robert F. Dye, Bartlesville, Okla., assignor to Phillips Petroleum Company, a corporation of Delaware Application December 28, 1956, Serial No. 631,205

5 Claims. (Cl. 260—88.2)

This invention relates to a process for separating olefinic hydrocarbons from hydrocarbon mixtures. In one aspect it relates to a process for separating olefinic hydrocarbons from a hydrocarbon mixture containing a lower and a higher boiling olefin and paraffin hydrocarbons. In another aspect it relates to a process for separately recovering olefinic hydrocarbons from a hydrocarbon mixture containing a lower and a higher boiling olefinic and paraffin hydrocarbons.

The separation and recovery of hydrocarbons from mixtures thereof is conventionally carried out by distillation and fractionation. In many instances however, the hydrocarbons which it is desired to recover are present in hydrocarbon mixtures containing other hydrocarbons of a similar boiling range. Thus, for example, it is difficult to recover propylene from a hydrocarbon mixture containing propane by fractionation. In such situations, it has been found desirable to recover the desired hydrocarbons by absorption wherein there is employed an absorbent which is selective for the material to be recovered. For example, in the situation presented, an absorbent which selectively absorbs olefins can be employed to effect the recovery of propylene from a propylene-propane mixture. Usually, an absorbent which is selective for a certain compound will also absorb other compounds of the same type. Thus, if the propylene-propane mixture also contains ethylene, the ethylene will be absorbed along with the propylene. Also, in most cases, the selective absorbent will absorb preferentially lower molecular weight molecules, thus, a selective olefin absorbent will preferentially absorb ethylene before propylene.

When the situation arises wherein a hydrocarbon mixture contains paraffins and at least two olefins, the purpose being to recover the olefins either as a mixture or separately, the quantity of absorbent required depends to a great extent on the amount of olefins which must be absorbed from the mixture. A procedure which can effect at least partial recovery of the olefins from the hydrocarbon mixture prior to absorption can substantially decrease the amount of absorbent required. Such a process is the subject of this invention.

It is an object of this invention to provide an improved process for recovering olefin hydrocarbons from hydrocarbon mixtures.

Another object of this invention is to provide an improved process for separating olefinic hydrocarbons from paraffinic hydrocarbons.

Still another object of this invention is to provide an improved process for separately recovering olefins from a mixture of olefin and paraffin hydrocarbons.

These and other objects of the invention become more readily apparent from the following detailed description and discussion.

The above objects are realized broadly by fractionating a mixture of hydrocarbons containing at least two olefin hydrocarbons, one boiling at a higher temperature than the other and at least one paraffin hydrocarbon which lies in the same boiling range as the higher boiling olefin, removing a portion of the lower boiling olefin from the mixture, thereafter contacting the mixture with an olefin absorbent and recovering the olefins from said absorbent.

As used herein the term "same boiling range" is intended to mean compounds sufficiently close in boiling point to make their separation by conventional fractionation difficult or impossible.

In one aspect of the invention, the individual olefins are recovered from the absorbent by successively subjecting the absorbent to selected conditions of temperature, pressure and/or stripping.

This invention is applicable in general to the treatment of hydrocarbon mixtures containing at least two olefins which are separable by distillation and at least one paraffin which is substantially non-separable from the higher boiling olefin by distillation. The terms "olefin" and "paraffin" as used herein are intended to have their usual meanings and include compounds such as ethylene, propylene, butenes, isobutene, pentenes, isopentenes, etc., methane, ethane, propane, butane, isobutane, pentane, isopentane, etc. Processes in which the invention is applicable include the treatment of various refinery gas streams, alkylation effluent streams, polymerization effluent streams, etc.

The invention will be described by particular reference to a copolymerization process employing ethylene and propylene as reactants. This is not intended, however, in any limiting sense and the treatment of other hydrocarbon mixtures containing olefins and paraffins is also within the scope of the invention.

Solid olefin polymers are prepared usually by contacting the olefin to be polymerized with a catalyst at an elevated temperature and pressure, preferably in the presence of a solvent or diluent material. The reaction product can be one of a wide variety of olefin polymers, such as for example, polymers or copolymers of mono-olefins like ethylene, propylene, butylene, etc., also copolymers of mono-olefins and diolefins such as butadiene, isoprene, etc.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ration, etc.

The polymerization pressure is often maintained at a sufficient level to assure a liquid phase reaction, that is at least about 100 to 300 p.s.i.g., depending upon the type of feed and diluent material and the polymerization temperature. Higher pressure up to 500 to 700 p.s.i.g. or higher can be used, if desired. When utilizing a fixed catalyst bed the space velocity varies from as low as about 0.1 to about 20 volumes of feed per volume of catalyst per hour, with the preferred range being between about 1 and about 6 volumes per volume. The polymerization process can also be carried out in the presence of a mobile catalyst. In this type of operation the catalyst concentration in the reaction zone is maintained between about 0.01 and about 10 percent by weight and feed residence time can be from 10 minutes or less to 10 hours or more.

A preferred polymerization method is described in detail in a copending application of Hogan and Banks, Serial No. 573,877, now Patent Number 2,825,721 filed March 26, 1956. This particular method utilizes a chromium oxide catalyst, preferably containing hexavalent chromium, with silica, alumina, silica-alumina, zirconia, thoria, etc. In one embodiment of this application, olefins are polymerized in the presence of a hydrocarbon diluent, for example an acyclic, alicyclic or aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either transinternal or terminal vinyl, depending on the particular process conditions employed. When low reaction temperatures, about 150° F. to about 320° F. and a mobile catalyst are used for polymerization, the product polymer is predominantly terminal vinyl in structure. When polymerization is carried out at higher temperatures and in a fixed catalyst bed, the polymer has predominantly transinternal unsaturation. Polymers prepared by both methods are also characterized by their high densities and high percentage of crystallinity at normal atmospheric temperatures.

Other less advantageous and nonequivalent procedures which employ different catalysts are also used for preparing olefin polymers. For example, polymers are prepared in the presence of organometallic compounds such as triethyl aluminum plus titanium tetrachloride, mixtures of ethylaluminum halides with titanium tetrachloride, and the like. Another group of catalyst which is used comprises a halide of a group IV metal such as, for example, titanium tetrachloride, silicon tetrabromide, zirconium tetrachloride, tin tetrabromide, etc., with one or more free metals selected from the group consisting of sodium, potassium, lithium, rubidium, zinc, cadmium and aluminum.

The solvent or diluent employed in the polymerization reaction includes in general, paraffins which dissolve the polymers at the temperature employed in the reaction zone. Among the more useful solvents are paraffins having between about 3 and about 12 carbon atoms per molecule, such as, for example, propane, isobutane, n-pentane, isopentane, isooctane, etc., and preferably those paraffins having 5 to 12 carbon atoms per molecule. Also useful in the polymerization reaction are alicyclic hydrocarbons, such as cyclohexane, methylcyclohexane, etc. Aromatic diluents are also used, however, in some instances they (or impurities therein) tend to shorten the catalyst life. All of the foregoing and in addition other hydrocarbon diluents which are relatively inert and in the liquid state at the reaction conditions may also be employed in carrying out the reaction of olefins to form solid polymers.

In carrying out the invention in one embodiment thereof, hydrocarbon gas stream from an olefin copolymerization process comprising at least two olefins, such as ethylene and propylene, and at least one paraffin in the same boiling range as the higher boiling olefin, such as propane, are introduced to a fractionating zone wherein a portion, usually a major portion, of the lower-boiling olefin is separated from the higher boiling olefin and paraffin. In the event that paraffin hydrocarbons boiling lower than the lower-boiling olefin are present in the feed stream, these materials can be taken overhead from the fractionation zone and the lower boiling olefin can be yielded as a side-stream.

The fractionation step is carried out in a conventional fractionator, the temperatures, pressures and reflux ratios being determined by conventional methods according to the materials being treated and the separation desired. When the feed to the fractionator comprises ethylene, propylene and propane, the fractionator can be operated, for example, at a pressure of about 360 p.s.i.g. and with top and bottom temperatures of about $-20°$ F. and about 50° F., respectively.

Following the fractionation step, the bottoms therefrom, comprising paraffins, higher boiling olefins and some lower boiling olefins are introduced to an absorption zone wherein they are contacted with an absorbent which selectively absorbs olefins. The operating conditions employed in this step are also determined to a great extent by the type of material to be treated, and also by the absorbent employed. When utilizing as an absorbent cuprous nitrate-mono-ethanolamine and as a feed material a mixture of ethylene, propylene and propane, the absorption step can be carried out at a pressure of between about 70 and about 200 p.s.i.g. and at a temperature between about 50° F. and about 90° F. The amount of absorbent employed also is subject to variation for the same considerations as the operating temperatures of the absorber. For the system described, and in general, it is desirable to use an absorbent ratio of between about 25 and 50 pounds of absorbent per pound of olefin in the feed to the absorber.

Recovery of absorbed olefins from the absorbent can be effected in any conventional manner, such as, by employing elevated temperatures, stripping, or flashing, or any combination thereof. Specifically, when cuprous nitrate-mono-ethanolamine is employed as the absorbent, it is desirable to use flash separation under a vacuum whereby possible decomposition of the absorbent is prevented. When recovering a mixture of ethylene and propylene from the foregoing absorbent, the stripping operation can be carried out, for example, at a temperature of about 125° F. and a pressure of about 5 p.s.i.a. When treating other mixtures absorbed in the same or other absorbents, suitable temperatures and pressures, and suitable quantities of stripping materials can be employed, as readily determined by those skilled in the art.

The absorbents which can be used in carrying out the invention comprise the cuprous salts, such as cuprous nitrate, cuprous fluoride, cuprous carbonate, cuprous oxalate, cuprous acetate, cuprous salicylate, cuprous benzolsulfonate, cuprous benzoate, cuprous sulfanilate, cuprous anthranilate, cuprous chloride, cuprous formate, etc. These salts are used in conjunction with an ammoniacal solution or a compound which holds the copper ion in solution as a complex. Other than ammonia these compounds can be acid amides, such as formamide, dimethylformamide or urea; amine acids such as glycine; aliphatic amines such as ethylenediamine, benzylamine, aniline or pyridine; and oxyalkylamines like propanolamine, monoethanolamine, diethanolamine, triethanolamine, aminodiglycol and methyldiethanolamine.

In one embodiment the invention relates to the recovery of individual olefins from a hydrocarbon mixture. In this embodiment the bottoms from the absorber, comprising the absorbent and absorbed olefins, are passed through a series of operations wherein the heavier and less preferentially absorbed olfin is separated from the lighter olefin. In the first step of this operation the absorber bottoms enter a stripper wherein substantially all of the heavier olefin is separated along with a portion of the lighter olefin. This stream is passed to a fractionator for recovery of the heavier olefin. The overhead from the fractionator, comprising a mixture of light and heavier olefin is recycled to the stripper feed. Recovery of substantially pure lighter olefin from the absorbent is effected by passing the stripper bottoms to a flash chamber wherein the olefin is flashed from the absorbent. The absorbent, substanitally free of olefins, is recovered as bottoms from the flash chamber and recycled to the absorber. Here again the particular operating conditions of temperature, pressure, etc. employed are dependent on the olefins to be recovered and the absorbent used. In any event, these conditions are readily determined within the skill of the art.

The method of this invention provides a substantial improvement over previous methods of operation. Since the quantity of absorbent employed in the absorption step is dependent on the amount of olefins to be absorbed, it is readily apparent that the removal of a substantial quantity of olefins by fractionation prior to absorption constitutes a substantial advantage. Not only does this invention reduce the amount of absorbent required, but also reduces the size of the absorber and the size of the flash separator or separators required in the subsequent separation of absorbent and olefinic hydrocarbons. The latter item is of particular importance when it is desirable or necessary to provide vacuum in conjunction with the recovery of the olefins. Vacuum operation at the best is an expensive procedure and when it is necessary to maintain a vacuum in large pieces of equipment or apparatus the cost often becomes prohibitive. The utility of the invention is particularly apparent when the lower boiling olefin which is preferentially absorbed is present in the feed to the fractionater in substantially greater quantities than the higher boiling olefin. However, any recovery of olefin from the feed mixture prior to absorption provides a savings in absorbent, absorption and stripping equipment, and vacuum equipment.

Figure 2:
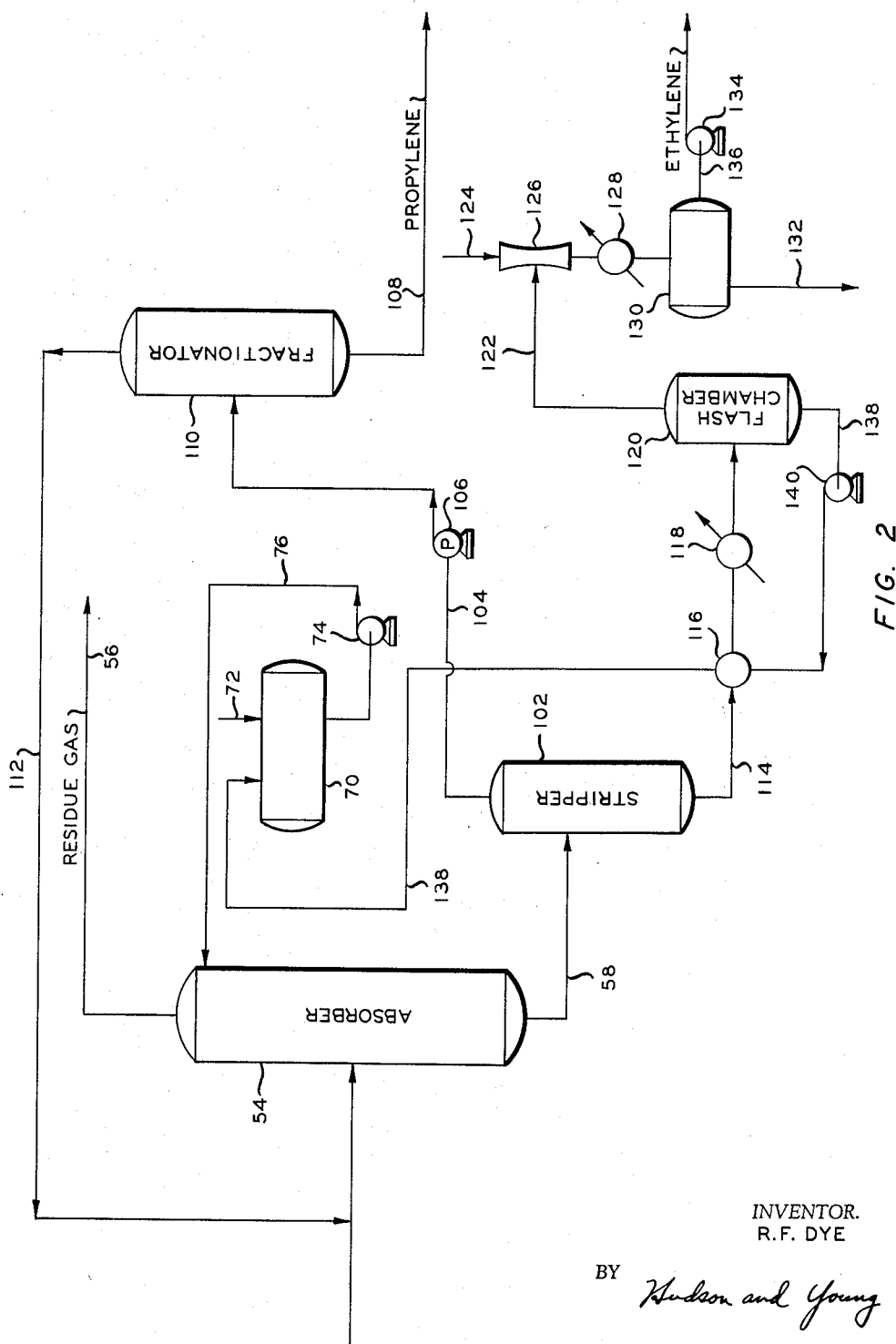

In order to more clearly describe the invention and provide a better understanding thereof, reference is had to the accompanying drawings of which, Figure 1 is a diagrammatic illustration of an ethylene-propylene copolymerization process and fractionation, absorption and flashing steps suitable for carrying out the invention and, Figure 2 is a diagrammatic illustration of an absorber and a series of strippers suitable for providing recovery of individual olefins as practiced in this invention.

Referring to Figure 1, a mixture of ethylene and propylene containing paraffin hydrocarbons, chromium oxide catalyst and cyclohexane diluent are introduced to reactor 8 through conduits 2, 4, and 6, respectively. For ease of handling the catalyst is slurried in cyclohexane before it is introduced to the reactor. During polymerization the material in the reactor is maintained in a highly agitated state by the use of a mechanical mixer or other conventional mixer means (not shown). The reaction is carried out at a temperature of about 240° F. and a pressure of about 500 p.s.i.a., and for a sufficient period of time to convert a portion of the ethylene-propylene feed to ethylene-propylene copolymer. The reaction effluent leaves the reactor through conduit 10 and enters a separation zone 12 wherein a stream comprising principally unconverted ethylene and propylene, various paraffin hydrocarbons present in the feed to the reactor, including methane, ethane, and propane and some cyclohexane solvent, is separated. Following this step the effluent is combined with additional solvent introduced through conduit 18. The mixture then passes through an exchanger 20 wherein the temperature is increased to ensure dissolution of substantially all of the polymer in the solvent material. The effluent then passes to catalyst recovery zone 24 through conduit 22. This zone may be a filter, a centrifuge or the like designed to operate at superatmospheric pressure. Separated catalyst which is removed through conduit 26 can be recycled to the reactor or discarded. As necessary, all or part of the recycle catalyst can be subjected to a regeneration treatment with oxygen for the removal of heavy polymers deposited thereon during polymerization. The remaining reaction effluent now comprising a solution of ethylene-propylene copolymer in cyclohexane is introduced in flash concentrator 30. In this vessel cyclohexane is vaporized, removed through conduit 31 and recycled through cyclohexane feed to the reactor (not shown). In this manner the concentration of diluent in the reaction effluent is reduced to a suitable level for separation and recovery of the polymer product. Removal of cyclohexane in the flash concentrator is effected by reducing the pressure, or by increasing the temperature, or by both. The polymer solution leaving the flash concentrator, through conduit 32, is passed through a series of separation steps (not shown) wherein recovery of dry polymer product is effected.

As previously stated, the material passing overhead from zone 12 through conduit 14 comprises a mixture of ethylene, propylene, methane, ethane, propane, and some cyclohexane diluent. This stream is cooled in exchanger 15 and introduced to separator 17 from which condensed cyclohexane is removed to conduit 21 for recycle to the reactor. The overhead from separator 17 passes through conduit 19, is compressed in compressor 34 and introduced to fractionator 36. Before the separator overhead enters the fractionator, heat introduced thereto during compression is removed by passing this material first through exchanger 52 countercurrent to the bottoms from the fractionator 36 and then through exchanger 53 in indirect heat exchange with ethylene withdrawn from fractionator 36. Within the fractionator, which may be a conventional bubble cap, perforated tray, etc. tower, a separation is effected between methane, which passes overhead from the tower, ethylene, which is withdrawn as a side stream from the tower through conduit 37 and recycled to reactor 8, and the remaining feed components which pass from the bottom of the fractionator through conduit 50. Cooling required for the fractionation operation is supplied by circulating the tower bottoms through an exchanger in indirect heat exchange with a conventional refrigerant such as propane. Methane passing overhead from the fractionator through conduit 38 is condensed in condenser 40 and enters accumulator 42. A quantity of this material equal to the net amount of methane in the feed is yielded from the unit through conduit 44. The remainder is withdrawn from the accumulator and returned to the fractionator as reflux through pump 46 and conduit 48. The fractionator bottoms comprising a substantially reduced quantity of ethylene, and ethane, propylene, and propane passes through conduit 50, heat exchanger 52 in indirect heat exchange with the fractionator feed and into cyclohexane separator 55. In this vessel the fractionator bottoms are flashed, cyclohexane being separated as the liquid phase and removed through conduit 57. The flash material is then recompressed in compressor 59, contacted with a refrigerant in exchanger 61 to remove compression heat and introduced to absorber 54. This vessel can contain a conventional baffle arrangement, perforated trays, or a suitable packing material for providing contact between the feed gases and the absorbent. In this particular example the absorbent employed comprises cuprous nitrate and monoethanolamine, introduced to the absorber through conduit 76. This material is a selective absorbent for olefins and effectively takes up these materials, leaving the paraffin compounds in the feed gas. Thus the residue gas leaving the top of the absorber through conduit 56 comprises substantially all of the ethane and propane entering the absorber. The absorber bottoms comprising absorbent, propylene and ethylene leave the absorber through conduit 58, pass through exchanger 60 countercurrent to recycle absorbent, through heater 62 and enter flash separator 64 wherein separation of absorbent from the olefinic hydrocarbons is effected. There is a possibility of decomposition of the absorbent at higher temperatures, therefore the flashing operation is preferably carried out under a vacuum. The flashed olefins are passed overhead from separator 64 through conduit 78, enter eductor 80, wherein they are picked up by steam introduced through conduit 82, and the mixture passes through conduit 84, condenser 86 and into accumulator 88. Condensed water is withdrawn from this vessel through conduit 90 and the olefinic gases are removed through conduit 92, pass into compressor 94 and are returned to the polymerization reactor through conduit 100. Prior to the latter step the gases are cooled in exchanger 60 and passed through drier 98 for the removal of water vapor, which is discarded through conduit 99. The stripper bottoms, comprising essentially absorbent, are passed through pump 66, conduit 68, exchanger 60, and into surge accumulator 70. From there the absorbent is drawn, as required, through pump 74 and returned to the absorber through conduit 76. Conduit 72 is provided for the purpose of supplying make-up absorbent.

The preceding embodiment of the invention has been directed to a process in which a mixture of olefins is recovered from a hydrocarbon mixture. However, it is also within the scope of the invention to treat similar hydrocarbon mixtures for the recovery of individual olefins. Such a process is illustrated in Figure 2. Referring to this figure, a feed material similar to that described in conjunction with the discussion of Figure 1 is introduced to absorber 54 wherein olefin components are absorbed in a copper nitrate monoethanolamine absorbent and paraffinic materials are rejected as residue gas through conduit 56. The absorbed olefins and absorbent pass from the bottom of the absorber via conduit 58 into stripper 102. In this vessel a mixture of propylene and ethylene are vaporized, passing overhead through conduit 104 and compressor 106 into fractionator tower 110. In the fractionator a further separation is made between propylene and ethylene with substantially pure propylene being yielded from the bottom of the fractionator and a mixture of propylene and ethylene being yielded overhead. The latter stream can be removed from the system or, if desired, recycled to the absorber through conduit 112. The bottoms from stripper 102 comprising essentially ethylene and absorbent, are passed through exchanger 116 countercurrent to recycle absorbent and heater 118, and introduced to flash chamber 120 via conduit 114. In this vessel ethylene is vaporized, passing overhead through conduit 122 and through a vacuum system similar to that employed in Figure 1. The product ethylene can be either yielded from the unit or recycled to the polymerization reactor through conduit 136 as desired. Absorbent bottoms from the flash chamber are returned through pump 140 and conduit 138 to the absorber in a manner similar to that previously described and shown in Figure 1.

The preceding discussion has been directed to preferred embodiments of the invention wherein a mixture of hydrocarbons containing ethylene and propylene olefins is treated for the removal of ethylene and propylene either separately or as a mixture. This, however, is not intended in any limited sense and other hydrocarbon mixtures containing other olefinic materials can also be treated within the scope of the invention.

The following examples are presented to illustrate typical applications of preferred embodiments of the invention on a commercial scale. The first example relates to a process wherein olefins are recovered as a mixture and the second example relates to a process wherein olefins are individually recovered from a hydrocarbon mixture.

In each example an ethylene-propylene copolymer is prepared in the presence of a catalyst comprising about 2.5 percent by weight of chromium as chromium oxide, containing about 2.2 percent by weight of hexavalent chromium, associated with silica-alumina (weight ratio 9:1), prepared by impregnating the silica-alumina with a solution of chromium oxide followed by drying and activation in dry air and gradually increasing temperatures up to 950° F. at which the catalyst is maintained for about five hours.

The polymer is prepared under the following conditions:

| | |
|---|---|
| Ethylene feed rate | 8170 lb./hr. |
| Propylene feed rate | 2050 lb./hr. |
| Cyclohexane feed rate | 52,800 lb./hr. |
| Catalyst concentration in reactor | 0.094 weight percent. |
| Copolymer composition | 10 weight percent propylene. |
| Pressure | 300 p.s.i.a. |
| Temperature | 240° F. |

Example I

| Flows: | | Lb./hr. |
|---|---|---|
| Fractionator feed | | 2,618 |
| Composition: | Wt. percent | |
| Methane | 0.8 | |
| Ethane | 3.2 | |
| Ethylene | 79.1 | |
| Propane | 4.0 | |
| Propylene | 8.6 | |
| Cyclohexane | 4.3 | |
| Fractionator reflux | | 4,750 |
| Fractionator sidestream | | 1,921 |
| Composition: | Wt. percent | |
| Methane | 0.7 | |
| Ethylene | 98.2 | |
| Ethane | 1.1 | |
| Fractionator bottoms | | 640 |
| Composition: | Wt. percent | |
| Ethane | 9.7 | |
| Ethylene | 21.1 | |
| Propane | 16.5 | |
| Propylene | 35.2 | |
| Cyclohexane | 17.5 | |
| Absorber bottoms | | 16,747 |
| Composition: | Wt. percent | |
| Ethylene | 0.9 | |
| Propylene | 1.0 | |
| Absorbent | 98.1 | |
| Flash separator bottoms | | 16,440 |
| Composition: | Wt. percent | |
| Ethylene | 0.1 | |
| Propylene | Trace | |
| Absorbent | 99.9 | |
| Flash separator overhead | | 307 |
| Composition: | Wt. percent | |
| Ethylene | 42.7 | |
| Propylene | 57.3 | |
| Absorbent | Trace | |

| Temperatures: | °F. |
|---|---|
| Fractionator— | |
| Top | −20 |
| Bottom | 50 |
| Absorber— | |
| Top | 53 |
| Bottom | 65 |
| Flash separator | 140 |

| Pressures: | P.s.i.a. |
|---|---|
| Fractionator | 360 |
| Absorber | 135 |
| Stripper | 5 |

Example II

| Flows: | | Lb./hr. |
|---|---|---|
| Absorber bottoms | | 16,747 |
| Composition: | Wt. percent | |
| Ethylene | 0.9 | |
| Propylene | 1.0 | |
| Absorbent | 98.1 | |
| Stripper overhead | | 186 |
| Composition: | Wt. percent | |
| Ethylene | 6.0 | |
| Propylene | 94.0 | |
| Fractionator bottoms | | 167 |
| Composition: | Wt. percent | |
| Ethylene | 0.5 | |
| Propylene | 99.5 | |
| Stripper bottoms | | 16,561 |
| Composition: | Wt. percent | |
| Ethylene | 0.8 | |
| Propylene | Trace | |
| Absorbent | 99.2 | |
| Flash chamber overhead | | 121 |
| Composition: | Wt. percent | |
| Ethylene | 100.0 | |
| Propylene | Trace | |
| Absorbent | Trace | |

| Temperatures: | °F. |
|---|---|
| Absorber (top) | 53 |
| Stripper (top) | 65 |
| Fractionator (top) | 88 |
| Flash chamber | 140 |

| Pressures: | P.s.i.a. |
|---|---|
| Absorber | 135 |
| Stripper | Atm. |
| Fractionator | 250 |
| Flash chamber | 5 |

Having thus described the invention by providing specific examples thereof it is to be understood that no undue restrictions or limitations are to be drawn by reason thereof and that many modifications and variations are clearly within the scope of the invention.

I claim:

1. A method for recovering at least two monoolefin hydrocarbons of different boiling points from a hydrocarbon mixture containing a paraffin hydrocarbon of the same boiling range as the higher boiling olefin which comprises separating a portion of the lower boiling olefin from the hydrocarbon mixture by fractionation, thereafter contacting the mixture with a selective absorbent whereby olefins remaining therein are absorbed, introducing the absorbent and absorbed olefins to a stripping zone wherein substantially all of the higher boiling less preferentially absorbed olefin and a portion of the more preferentially absorbed olefin are desorbed, introducing the desorbed olefins to a fractionation zone wherein the higher boiling olefin is separated and recovered, recycling a mixture of olefins from said fractionation zone to the absorption zone and introducing the bottoms from the stripping zone to a flash zone wherein separation of the lower boiling olefin and absorbent is effected.

2. The process of claim 1 in which the olefin-paraffin mixture comprises ethylene, propylene and propane.

3. In a polymerization process in which ethylene and propylene are reacted to form a copolymer, in which the reaction effluent is treated to effect the removal of a hydrocarbon mixture comprising unreacted ethylene, propylene and at least one paraffin hydrocarbon for the purpose of providing an olefin recycle to the polymerization reaction, the improvement which comprises separating a portion of the lower boiling olefin from the hydrocarbon mixture by fractionation, thereafter contacting the mixture with a selective absorbent whereby olefins remaining therein are absorbed, introducing the absorbent and absorbed olefins to a stripping zone wherein substantially all of the propylene and a portion of the ethylene are desorbed, introducing the desorbed olefins to a fractionation zone wherein propylene is separated and recovered, recycling a mixture of ethylene and propylene from said fractionation zone to the absorption step and introducing the bottoms from the stripping zone to a flash zone wherein separation of ethylene and absorbent is effected.

4. The process of claim 3 in which the hydrocarbon mixture comprises ethylene, propylene and propane.

5. In a polymerization process in which two mono-olefins are reacted to form a copolymer, in which the reaction effluent is passed to a separation zone wherein a mixture of unreacted olefin and paraffin hydrocarbons are removed for the purpose of providing an olefin recycle to the polymerization reaction, the improvement which comprises separating a portion of the lower boiling olefin from the olefin paraffin mixture by fractionation, thereafter contacting said mixture with a selective absorbent whereby the olefins remaining therein are absorbed, introducing the absorbent and absorbed olefins to a stripping zone wherein substantially all of the higher boiling less preferentially absorbed olefin and a portion of the more preferentially absorbed olefin are desorbed, introducing the desorbed olefins to a fractionation zone wherein the higher boiling olefin is separated and recovered, recycling a mixture of olefins from said fractionation zone to the absorption step and introducing the bottoms from the stripping zone to flash zone wherein separation of the lower boiling olefin and absorbent is effected.

References Cited in the file of this patent

UNITED STATES PATENTS

| | | |
|---|---|---|
| 2,386,310 | Hachmuth | Oct. 9, 1945 |
| 2,388,913 | Hall | Nov. 13, 1945 |
| 2,445,520 | Francis et al. | July 20, 1948 |
| 2,691,647 | Field | Oct. 12, 1954 |
| 2,702,288 | Hoeksema et al. | Feb. 15, 1955 |